(12) United States Patent
Haller et al.

(10) Patent No.: US 8,950,812 B2
(45) Date of Patent: Feb. 10, 2015

(54) FOLDABLE VEHICLE SEAT

(75) Inventors: Thomas Haller, Ursensollen (DE);
Johann Meier, Fensterbach (DE);
Rudolf Kastner, Kuemmersbruck (DE);
Franz Schneider, Ebermannsdorf (DE)

(73) Assignee: Grammer AG, Amberg (DE)

( * ) Notice: Subject to any disclaimer, the term of this patent is extended or adjusted under 35 U.S.C. 154(b) by 399 days.

(21) Appl. No.: 13/275,494

(22) Filed: Oct. 18, 2011

(65) Prior Publication Data

US 2012/0091771 A1    Apr. 19, 2012

(30) Foreign Application Priority Data

Oct. 19, 2010    (DE) .......................... 10 2010 048 719

(51) Int. Cl.
*B60N 2/24* (2006.01)
*B60N 2/30* (2006.01)
*B60N 2/20* (2006.01)
*B60N 2/38* (2006.01)

(52) U.S. Cl.
CPC ................ *B60N 2/305* (2013.01); *B60N 2/206* (2013.01); *B60N 2/24* (2013.01); *B60N 2/3013* (2013.01); *B60N 2/38* (2013.01)
USPC ...................................... 297/378.12; 297/336

(58) Field of Classification Search
USPC ................................. 297/13, 378.12, 335, 336
See application file for complete search history.

(56) References Cited

U.S. PATENT DOCUMENTS

| 5,083,836 | A  | * | 1/1992  | Beasley ........................... 297/13 |
| 5,797,649 | A  |   | 8/1998  | Snell, Jr. et al. |
| 7,229,132 | B2 | * | 6/2007  | Meeker et al. ....... 297/378.12 X |
| 7,837,267 | B2 | * | 11/2010 | Zink et al. ................ 297/378.12 |

FOREIGN PATENT DOCUMENTS

| EP | 2 060 436 | 5/2009 |
| GB | 2 337 925 | 12/1999 |

OTHER PUBLICATIONS

Office Action for European Patent Application No. 11185801.5, mailed Jan. 5, 2012.

* cited by examiner

*Primary Examiner* — Anthony D Barfield
(74) *Attorney, Agent, or Firm* — Lathrop & Gage LLP

(57) ABSTRACT

The invention relates to a foldable vehicle seat, in particular for utility vehicles, with a backrest and a seat part, wherein the backrest is made foldable and is connected at least to a first cam element and the seat part is made foldable and is connected at least to a second cam element, wherein the two cam elements are arranged at a distance from each other in the width-wise direction of the seat and are arranged so as to be rotatable about a common axle extending in the width-wise direction of the seat, so that the backrest and the seat part are rotatable by at least 90°.

9 Claims, 8 Drawing Sheets

FOLDABLE VEHICLE SEAT

CROSS REFERENCE TO RELATED APPLICATIONS

This application claims the benefit of priority from German Patent Application No. 10 2010 048 719.8, filed Oct. 19, 2010, which is hereby incorporated by reference in its entirety.

DESCRIPTION

The present invention relates to a foldable vehicle seat, in particular for utility vehicles, with a backrest and a seat part according to the preamble of claim 1.

Vehicle seats, in particular vehicle seats with a foldable backrest and a seat part arranged in a stationary manner, are widely known for example in the motor car sector, in which case for example the backrest can be moved into a horizontal position in order to give the passenger the opportunity to relax in a reclining position, or it can also be folded in the direction of the seat part, as a result of which a deposition element, such as for example a table, is formed for example in larger vehicles, such as in SUVs.

In addition, seats are also known from the prior art which can be rotated through a defined angle by a rotary console in order consequently to satisfy the various requirements of the passengers concerning the direction of the seat.

If additional space is required in the vehicle, however, in order for example to be able to stow additional luggage or shopping, then the seats must first be removed from the vehicle completely and stored for example in the home or the cellar. On account of the strict safety requirements concerning a vehicle seat in force today, this removal also involves a certain effort and, in addition, frequently requires as well an advanced technical understanding of the arrangement and the design of the seat.

In contrast, the drivers' seats arranged in a utility vehicle, such as for example a tractor or a fork-lift truck, are connected to the vehicle bodywork or the inner wall of the vehicle in such a way that they cannot be removed and re-fitted again by a driver of the vehicle without essential elements of the vehicle or the interior of the vehicle having to be dismantled beforehand.

In addition, because of the restricted interior space in a utility vehicle, only one driver's seat is generally provided in the utility vehicle, since a second passenger's seat arranged in a fixed manner would occupy so much space in the interior that the driver either no longer reaches areas of the interior important to him or can no longer get to the driver's seat without obstruction. As a result, it is not possible for the driver to convey a further passenger in his utility vehicle.

Since, however, the tractor is preferably also used as a means of conveying and transport in private agricultural operation, there is a need for at least one further passenger to be conveyed sitting in the interior, whilst taking into consideration the present legal requirements, without the driver being constantly adversely affected by the provision of a second seat.

Accordingly, the object of the present invention is to make available a foldable passenger seat which makes it possible for it to be folded together in a space-saving manner, in which case the requirements of the passenger for comfortable sitting and the legal requirements for safely conveying a passenger are taken into consideration.

This object is attained by the present invention by means of a foldable vehicle seat according to claim 1.

What is accordingly claimed is a foldable vehicle seat, in particular for utility vehicles, with a backrest and a seat part, in which case the backrest is made foldable and is connected at least to a first cam element and the seat part is made foldable and is connected at least to a second cam element, the two cam elements being arranged at a distance from each other in the width-wise direction of the seat and being arranged so as to be rotatable about a common axle extending in the width-wise direction of the seat, so that the backrest and the seat part are rotatable by at least 90°.

Consequently the vehicle seat has not only a foldable or pivotable backrest but also a foldable or pivotable seat part, in which case the vehicle seat or the seat is accordingly capable of being locked in at least three different positions of use.

That is to say, in a first space-saving position, in which the backrest and likewise the seat part are orientated substantially at a right angle or perpendicularly or vertically to a surface of the vehicle floor, i.e. the seat part is folded up in the direction of the backrest. In addition, the seat according to the invention is capable of being locked in a sitting position, i.e. the backrest is orientated substantially at a right angle to the surface of the vehicle floor, in which case the seat face is orientated substantially parallel to the surface of the vehicle floor, as a result of which the seat part and the backrest consequently span an angle of at least 90°, so that a passenger or a person can sit in the vehicle seat according to the invention. The third position, in which the seat according to the invention is capable of being locked, is the deposition or table position, in which the backrest and the seat part are orientated substantially parallel to the surface of the vehicle floor, i.e. the backrest is folded in the direction of the folded-up seat part. Consequently the seat according to the invention provides the possibility of being able to deposit various articles on the rear side of the backrest.

In this case the surface of the vehicle floor is a plane extending substantially parallel to the roadway, this plane being orientated substantially horizontally when the vehicle is standing on a level roadway, without inclinations, ascents or drops.

The folding mechanism of the seat part and of the backrest of the seat according to the invention is made possible by at least two cam elements and leaf springs arranged on them, the cam elements having in each case a cam path and an edge which is made substantially nonuniform. This means that the edge of the cam elements extends non-centrally about the centre point or the axis of rotation of the cam element. Accordingly, the cam elements are elements known from the prior art and will consequently not be further described here.

The backrest and the seat part of the seat according to the invention are preferably connected in each case to a separate cam element, the cam elements preferably being mounted on a common axle—which extends substantially in the width-wise direction of the seat—and rotating about this axle.

In this case the cam elements are arranged at a distance from each other at least locally, so that the cam elements have the ability of being able to rotate about the axle independently of each other.

In a preferred embodiment the first and the second cam element have in each case at least two locking areas. These locking areas are preferably arranged—spaced from each other—at an angle of approximately 90°, and in a further preferred manner at an angle of from 90° to 110°, with respect to each other on the cam path of the cam element.

The at least two cam elements can have in each case a mutually different shape, but the cam paths or the edges of the cam elements between the two locking areas are made substantially identical.

It is preferable for the locking areas to be designed in the form of recesses for the engagement of a portion of an area of at least one leaf spring in each case which is made curved at least in part.

This means that only a defined area of leaf springs arranged on the cam elements engages in these locking areas or recesses or indentations, and accordingly at least two leaf springs are arranged in the seat according to the invention.

The leaf springs have an area which is situated on the cam elements and which is curved in such a way with respect to the leaf spring formed substantially in a straight line that a contact of the cam element or the edge of the cam element with the leaf spring takes place only over this bent or curved or deformed area of the leaf spring.

It is thus preferable for the at least one leaf spring, which interacts with the cam element, to rest in each case against each cam element on the outside, as at least the portion of the leaf spring engages in the locking areas.

This means that when the cam element turns about the common axle the leaf spring or the portion of the leaf spring engaging in the locking area of the cam element is moved out of one locking area, is guided by way of the edge of the cam element as far as the other locking area and then engages in the second locking area.

Consequently it is preferable for at least the curved area of the leaf springs to be substantially permanently in contact with the respective cam elements.

In a further preferred embodiment the cam elements are designed in the form of cam discs which in each case have one edge at least locally on which the recesses are arranged.

In accordance with the cam elements listed above which can be designed for example in the form of cam rollers or cylinder-type cams, the cam disc likewise has at least two locking areas or recesses or indentations which are arranged at a distance from each other on the cam path, namely the edge of the cam disc preferably at an angle of approximately 90°, and in a further preferred manner at an angle of from 90° to 110°.

It is also possible, however, for the cam elements or the cam discs to have more than two locking areas in each case, the third or the fourth locking area preferably being arranged not between the first and second locking areas but in front of the first and/or behind the second locking area, in order to be able to lock the seat part and the backrest respectively in widely differing positions with respect to each other.

Consequently the backrest can be folded not only towards the front, but also towards the rear, or can be locked in various positions folded towards the rear. Alternatively, the seat part can occupy a position inclined with respect to the surface of the vehicle floor, so that for example the front area of the seat part in the direction of travel is inclined in the direction of the surface of the vehicle floor.

In addition, it is possible for the two cam elements to have a mutually different number of locking areas, so that for example the cam element which is connected to the seat part has only two locking areas, whereas the cam element which is connected to the backrest has for example three or more locking areas.

It is preferable for the locking areas to extend in the radial direction from the surface of the edge of the cam disc towards the inside and over the entire width of the edge of the cam disc and over a defined area along the edge of the cam disc.

Accordingly, the locking areas or the recesses form a divergence from the cam path of the cam element, which extends from the cam path radially towards the inside to the cam disc and is preferably essentially in the form of the bent portion of the leaf spring which engages in the recesses of the edge of the cam disc or the cam element respectively.

It is preferable for the at least two locking areas or recesses of the at least two cam discs to be arranged in such a way that the first recess of the first cam disc is not opposite the first recess of the second cam disc in the width-wise direction of the seat in any positioning of the seat part and the backrest.

In fact the first locking area of the first cam element is situated substantially opposite the first locking area of the second cam element in the width-wise direction of the seat when a seat face of the seat element extends substantially parallel and a resting face of the backrest extends substantially at a right angle to a surface of the vehicle floor.

This means that in this case the seat is in a sitting position in which a person can sit on the seat, since on the one hand the backrest is folded towards the rear or upwards and the seat part is folded downwards, as a result of which the two elements, i.e. the seat part and the backrest, are situated in a folded-up state in each case.

In addition, the second locking area of the second cam element is for example preferably situated substantially opposite the first locking area of the first cam element in the width-wise direction of the seat when a seat face of the seat element and a resting face of the backrest extend substantially at a right angle to a surface of the vehicle floor in each case.

In this space-saving position of the seat according to the invention the backrest is folded towards the rear or upwards and is consequently in a folded-up state, in which the seat part is folded upwards in the direction of the backrest and is accordingly in a state folded shut. In such a position the seat uses only a small area of the interior of the vehicle available to the seat according to the invention.

The second locking area of the first cam element is preferably substantially opposite the first locking area of the second cam element in the width-wise direction of the seat when a seat face of the seat element and a resting face of the backrest extend substantially parallel to a surface of the vehicle floor in each case.

In this arrangement of the seat part with respect to the backrest the seat occupies a table or deposition position, since the backrest is folded in the direction of the seat part in the folded-up state, so that the resting face of the backrest is opposite the seat face of the seat part, in which case the rear side of the backrest forms a table or a deposition face which extends substantially horizontally or parallel to the surface of the vehicle floor.

The rear side of the backrest has for example a deposition face with a shaped portion in the manner of a shell and/or recesses in the form of a cup etc., which is preferably produced from plastics material or another dirt-resistant material. The deposition face which is fixed or arranged on the rear side of the backrest consequently makes it possible to deposit various articles in a non-slip manner on it.

In addition, in a preferred embodiment the backrest is arranged with the side opposite the side arranged on the first cam element with a first support arm rotatable about the common axle.

Accordingly, the backrest is mounted not only by way of the cam element on the common axle but at the same time by way of a support arm which is likewise mounted on the common axle so as to be rotatable about this axle. Accordingly, a distribution or dispersal of force can take place by way of the cam element on the one hand and by way of the support arm on the other hand.

In addition, the seat part is preferably arranged with the side opposite the side arranged on the second cam disc with a second support arm rotatable about the common axle.

Consequently the seat part is also mounted not only by way of the cam element on the common axle but also by way of a support arm which is mounted so as to be rotatable on the common axle.

An overloading of the two cam elements is accordingly avoided and a simple movement or a simple folding of the backrests and of the seat part is made possible.

In this case the at least two support arms and the at least two cam elements are arranged at a distance from one another and in a rotatable manner on a common axle in such a way that they do not block one another or obstruct one another in their movement, and this is preferably achieved in that for example the support arm and the cam element of the backrest are arranged inside or between the support arm and the cam element of the seat part in the width-wise direction of the seat.

It is also possible, however, for the support arm and the cam element of the seat part to be arranged for example inside or between the support arm and the cam element of the backrest in the width-wise direction of the seat.

The leaf springs, which engage with the bent portion into the locking area, are preferably arranged in each case with an end area rotationally rigid at least locally in one respective clamping apparatus which is releasable in order to replace the leaf springs.

As a result, it is possible for the leaf springs to be replaced in a rapid and simple manner if for example there is damage to the leaf springs.

In addition, it is possible for the vehicle seat to have a cup holder or a bottle holder which is arranged not on the rear side of the backrest but in a rear region of the side in the longitudinal direction of the seat, and preferably between a holding apparatus for applying the seat in a region of the vehicle and the seat part or the backrest respectively. This cup holder can consequently be used when the backrest is folded shut in the direction of the seat part, i.e. when the backrest or the resting face of the backrest and the seat part or the seat face of the seat are situated substantially parallel to the surface of the vehicle floor and the seat is accordingly locked in a table position.

In addition, it is possible for the seat to have a belt system with a belt tensioning means or a belt retractor apparatus, a belt lock, a belt strap and an insertion tongue or belt tongue. This belt system is arranged directly on the vehicle seat and can be assembled and dismantled jointly with the entire seat, so that no additional assembly of a separate belt system inside the vehicle is necessary.

Consequently, the seat according to the invention can be incorporated or mounted as a second seat in a vehicle or a utility vehicle or can also act as a vehicle seat which for example is arranged in the vehicle in the place of the previous vehicle seat.

Further advantages, aims and properties of the present invention are explained with reference to the following description of accompanying drawings, in which an embodiment of the seat according to the invention and views of different positionings of the cam elements of an embodiment of the seat according to the invention are illustrated by way of example.

Components which correspond at least substantially with respect to their function in the figures can be designated with the same references in this case, it being unnecessary for these components to be designated and explained in all the figures. In the figures FIG. 1 is an outline drawing of an embodiment of the vehicle seat according to the invention which is locked in a sitting position;

Figure 1:
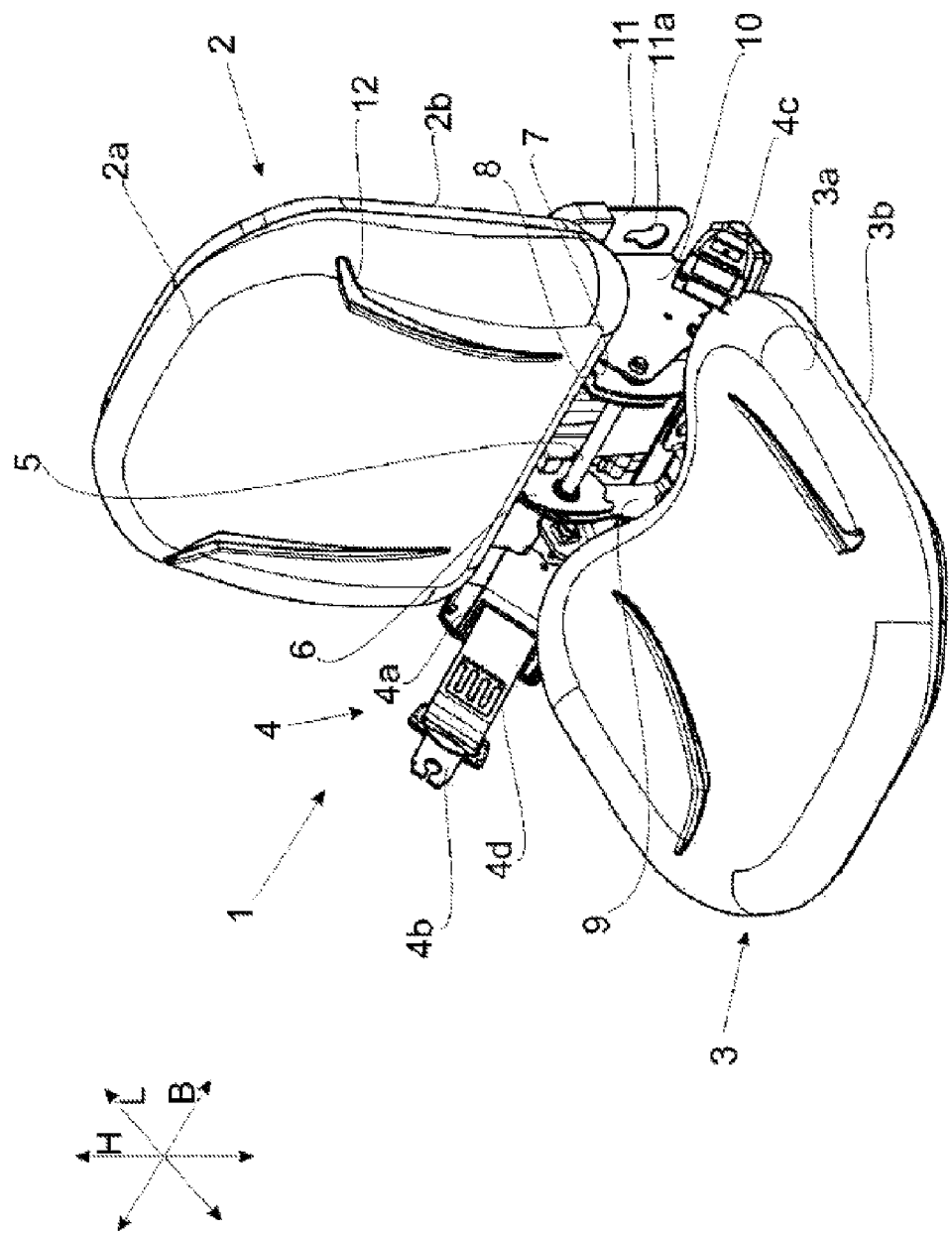

FIG. 1 is an outline drawing of an embodiment of the vehicle seat 1 according to the invention in a sitting position, i.e. the backrest 2 or the resting face 2a extends at a right angle to the surface of the vehicle floor (not shown here) or in the vertical direction H of the seat, the seat part 3 or the seat face 3a of the seat part 3 extending parallel to the surface of the vehicle floor or in the longitudinal direction L of the seat.

The resting face 2a and the seat face 3a are preferably upholstered in each case at least in part and rest on a frame 2b of the backrest or a frame 3b of the seat part or are arranged in a slip-free manner on these frames.

The frame 2b of the backrest is arranged in a rotatable manner with a first cam disc 6 and a first support arm 8 on a common axle 5 which extends in the width-wise direction B of the seat, the frame 3b of the seat frame likewise being arranged in a rotatable manner with a second cam disc 7 and a second support arm 9 on the common axle 5.

The common axle 5 is mounted in a rotationally rigid manner by means of two lateral fastening elements 10 which are arranged substantially on both sides of the common axle 5 in the width-wise direction of the seat and which extend at least locally in the longitudinal direction L of the seat. These fastening elements 10 are arranged on holding elements 11 which extend outwards substantially in the width-wise direction B of the seat and which are arranged on the rear end of the fastening elements 10 in the longitudinal direction L of the seat.

Consequently it is possible for the holding elements 11 and the fastening elements 10 to comprise a single element in which the individual portions of the holding element 11 and of the fastening element 10 are produced by bending a specific area.

On the other hand, the two elements 10, 11 can also be individual or independent elements 10, 11 which are joined to each other, for example welded, in a join area.

The holding elements 11 have in each case a through opening 11a or a bore 11a through which screws or the like can be passed in order to be able to attach the holding elements 11 and thus the entire seat 1 to a region in the interior of the vehicle.

The first cam disc 6 and the first support arm 8 are arranged on the common axle 5 between the second support arm 9 and the second cam disc 7 and are accordingly enclosed by the second support arm 9 and the second cam disc 7.

It is also possible, however, for the first cam disc 6 and the first support arm 8 to enclose or bound the second cam disc 7 and the second support arm 9 in the width-wise direction B of the seat.

In addition, as shown in FIG. 1 a belt system 4, which comprises a belt tensioning means 4a or a belt retractor 4a, an insertion tongue 4b, a belt lock 4c and a belt strap 4d, is arranged on the seat 1.

In this case the belt lock 4c is arranged on one side of the seat 1 in the width-wise direction B of the seat, and the belt retractor 4a, the belt tongue 4b and the strap 4d, which is fastened to the insertion tongue and which is rolled up and tensioned in a fixed manner by the belt retractor 4a, are arranged on the other side of the seat 1 in the width-wise direction B of the seat.

In addition, the preferably upholstered seat face 3a and resting face 2a have corrugations 12 or depressions 12 extending over the seat face 3a and resting face 2a respectively in the upholstery 2a, 3a, in order for example to permit the circulation of air between the passenger (not shown here) sitting on the seat and the seat 1, so that the passenger does not perspire even at very hot ambient temperatures in the contact area 2a, 3a with the seat 1.

As shown in FIG. 1 the corrugations extend on or in the resting face 2a substantially in the vertical direction H of the seat from the lower area of the resting face 2 as far as the upper area of the resting face 2a and they have an area curved outwards there.

In or on the seat face 3a the corrugations 12 extend in the longitudinal direction L of the seat from a rear area of the seat face 2a in the direction of a front region in order to merge into an area curved outwards there.

In this illustrated embodiment the seat face 3a and the resting face 2a have two corrugations 12 in each case, in which case, however, it is also possible for more than two corrugations 12 to be provided. In addition, the shape of the corrugations 12 and the arrangement thereof with respect to each other is not limited to this embodiment.

Figure 2:
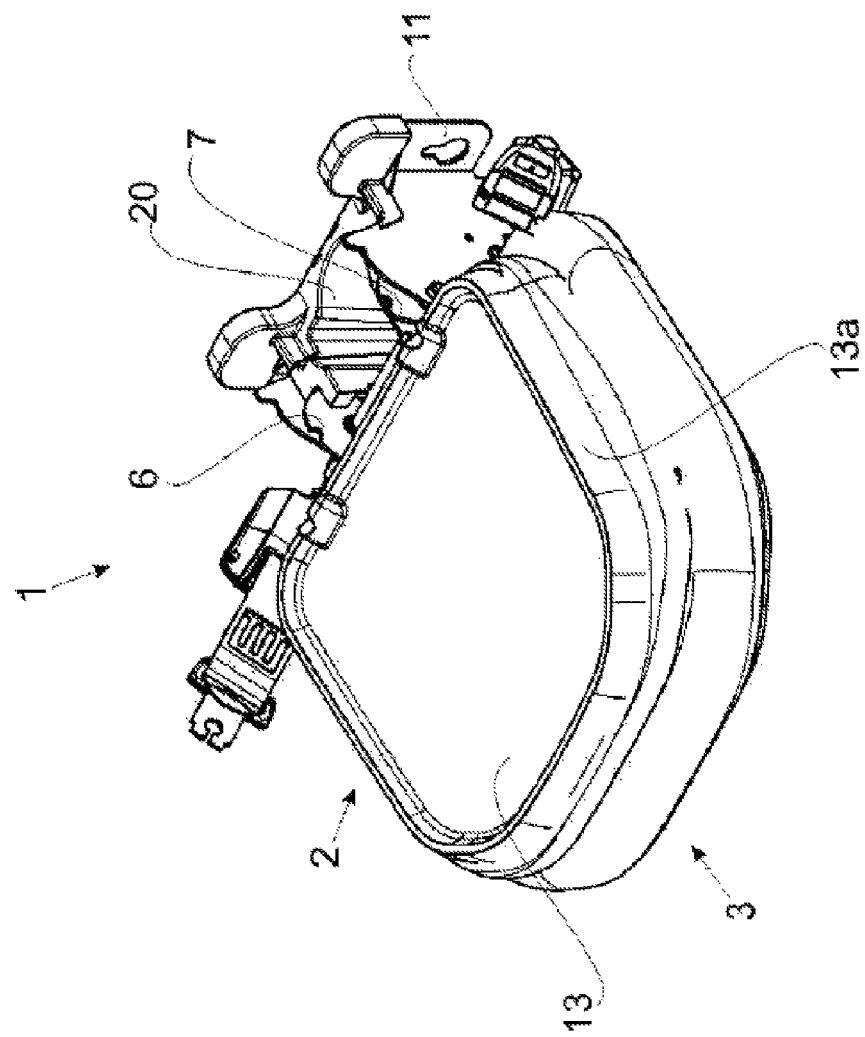
FIG. 2 is an outline drawing of an embodiment of the vehicle seat according to the invention which is locked in a table or deposition position.
Figure 2:
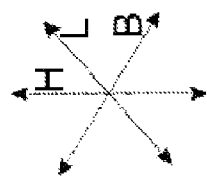

FIG. 2 is an outline drawing of an embodiment of the vehicle seat 1 according to the invention which is locked in a table or deposition position.

Consequently the backrest 2 or the resting face 2a of the backrest respectively and the seat part 3 or the seat face 3a of the seat part 3 extend parallel to the surface of the vehicle floor (not shown here) or in the longitudinal direction L of the seat, as a result of which a table element 13 which is arranged on the rear side of the backrest 2, preferably on the frame 2b of the backrest, is orientated substantially parallel to the surface of the vehicle floor.

This table element 13 has a continuous edge 13a or raised portion 13a by which for example it is possible to prevent an article deposited on the table element 13 from sliding down, for example during the travel of the vehicle.

The table element 13 and the continuous edge 13a are preferably produced from plastics material, such as for example polyethylene, polypropylene, polyvinyl chloride, mixtures of materials or other materials which are preferably dirt-repellent and durable for their lifetime.

In addition, FIG. 2 shows a cup holder or bottle holder 20 which is arranged in the form of an independent and interchangeable element between the seat 1 and the holding elements in order to be able to insert a cup, which is filled for example with a liquid medium, or a drinks bottle in the holder 20.

The cup held by the holder 2 is consequently arranged between the lateral fastening elements 10 and between a wall (not shown here) of the vehicle, on which the holding elements 11 are arranged, and the seat 1 with the backrest 2 and the seat part 3, and in this way it is protected from jolts, for example on rough terrain, in such a way that tilting of the cup or the bottle during the travel or the operation of the vehicle is prevented.

Figure 3:
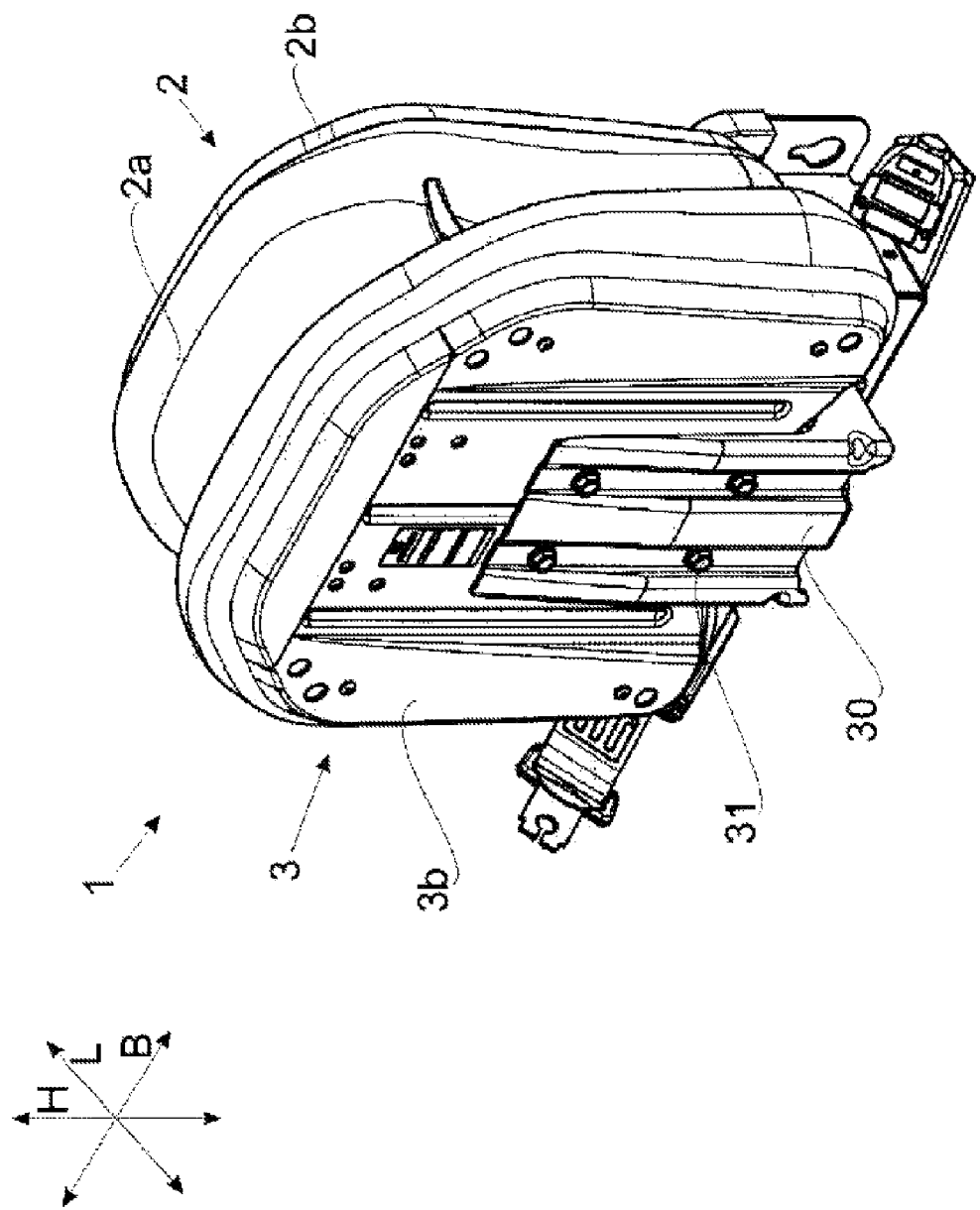
FIG. 3 is an outline drawing of an embodiment of the vehicle seat according to the invention which is locked in a space-saving position.

FIG. 3 is an outline drawing of an embodiment of the vehicle seat 1 according to the invention which is locked in a space-saving position, in which case the seat part 3 and the backrest 2 are orientated substantially at a right angle or perpendicularly to the surface of the vehicle floor (not shown here) or extend in the vertical direction H of the seat.

The frame 3b of the seat part 3 is fixed on a support element 30 or a support plate 30 by means of screws 31, the L-shaped support element 30 extending upwards with an area in the vertical direction H of the seat and towards the rear with another area in the longitudinal direction L of the seat as seen in the view according to FIG. 3.

The area of the support element 30 extending towards the rear in the longitudinal direction L of the seat consequently has two extending support arms (not shown here), one support arm opening in the second cam disc (not shown here) and the other support arm opening in the second support arm (not shown here) of the seat part 3.

Consequently the seat part 3 is connected by way of the support element 30 to the second cam disc and the second support arm, which are mounted so as to be rotatable in each case about the common axle (not shown here).

It is consequently also possible for a further support element (not shown here) to be arranged on the rear side of the backrest 2 between the frame 2b of the backrest and the table element (not shown here) which is connected to the first cam disc (not shown here) and the first support arm (not shown here), which are mounted in a rotatable manner on the common axle.

Figure 4:
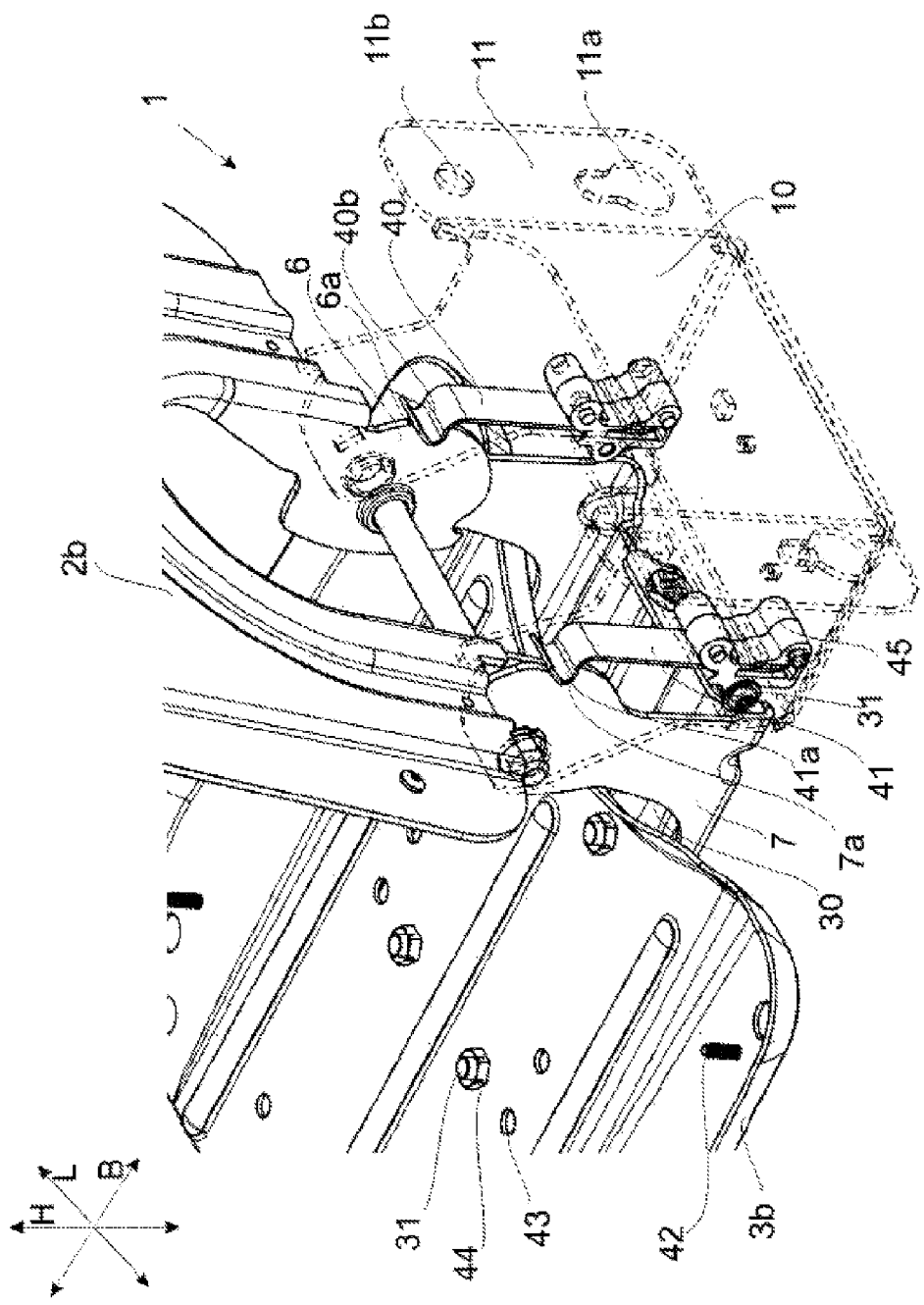
FIG. 4 is a partial view of the base frame of an embodiment of the vehicle seat according to the invention which is locked in a sitting position.

FIG. 4 is a partial view of the base frame of an embodiment of the vehicle seat 1 according to the invention which is locked in a sitting position as shown in FIG. 1, the frame 2b of the backrest being orientated at a right angle to the surface of the vehicle floor (not shown here) or in the vertical direction H of the seat and the seat frame 9b being orientated parallel to the surface of the vehicle floor or in the longitudinal direction L of the seat.

The frame 2b of the backrest and the frame 3b of the seat part have a plurality of bores 43 by means of which for example the support element 30 can be fixed to the frame 3b of the seat part. To this end, screws 31 are passed from below through bores in the support element 30 and the frame 3b of the seat part in the longitudinal direction L of the seat in order to be fastened above the frame 3b of the seat part by means of nuts 44 for example in the longitudinal direction L of the seat.

In addition, a plurality of springs 42, which are used for example for fastening or for clamping the seat cushion (not shown here) in the frame 3b of the seat part, are arranged in the frame 3b of the seat part.

Consequently the frame 3b of the seat part is an independent element which is connected by way of the support element 30 to the second cam disc 7 and the second support arm 9.

The frame 2b of the backrest is directly connected to the first cam disc 6 and the first support arm 8, by the two elements 6, 8 being arranged directly on the frame 2b of the backrest or being connected to it or being formed by it respectively. The preferably non-releasable connection between the frame 2b of the backrest and the elements 6, 8, which is formed for example by a weld, can also however be made releasable, for example by means of a screw fastening.

In addition, as shown in FIG. 4, two leaf springs 40, 41 are provided, which are arranged in a rotationally fixed manner in a clamping apparatus 45 with a lower area in the vertical direction H of the seat and which with their upper end—in the vertical direction H of the seat—which has an area 40a, 41a curved substantially in an S shape engage in one of the locking areas 6a, 7a, in which case, however, only one portion 40a, 41a of the curved area engages in the recesses 6a, 7a.

The clamping apparatus 45 are clamped in each case by means of screw fastenings 31 in order to permit a rapid replacement of the individual leaf springs 40, 41.

It is also possible, however, for the leaf springs 40, 41 to extend in the longitudinal direction L of the seat, i.e. substantially horizontally to the surface of the vehicle floor (not shown here) in the direction of the cam discs 6, 7, in order to engage there in the recesses 6a, 7a of the cam discs 6, 7 with a portion of the curved area 40a, 41a. Accordingly, the clamping apparatus 45 for fixing or clamping the leaf springs 40, 41 would also be situated, not below the curved area 40a, 41a in the vertical direction H of the seat as shown in FIG. 4, but adjacent to the curved area 40a, 41a of the leaf springs 40, 41 in the longitudinal direction L of the seat.

In addition, the holding elements 11 and the lateral fastening elements 10 are indicated by means of the broken lines. The holding elements 11 have two bores 11a and 11b, the first bore 11a being used to fix the seat 1 on a wall in the interior of the vehicle and the second bore in order for example to arrange or fasten the cup holder (not shown here) to the holding elements 11.

In accordance with the sitting position of the seat 1 as shown in FIG. 4, the first locking area 6a of the first cam disc 6 is opposite the first locking area 7a of the second cam disc 7 in the width-wise direction B of the seat.

Accordingly, the second locking area 6b of the first cam disc 6 is situated below the common axle 5 in the vertical direction H of the seat and the second locking area (not shown here) of the second cam disc 7 is situated above the common axle 5 in the vertical direction H of the seat.

Figure 5:
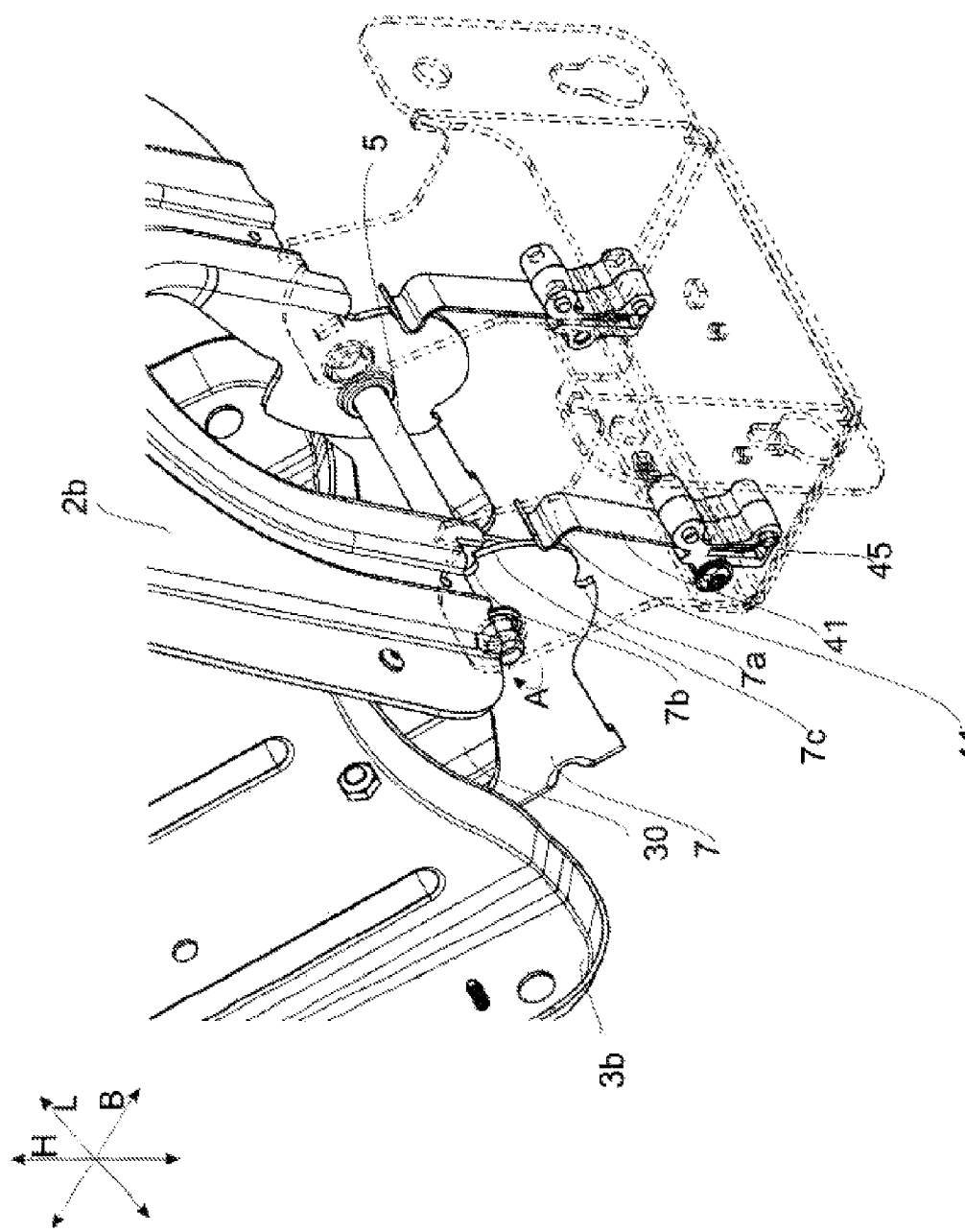
FIG. 5 is a partial view of the base frame of an embodiment of the vehicle seat according to the invention which is present in a transition position for example from a sitting position to a space-saving position.

FIG. 5 is a partial view of the base frame of an embodiment of the vehicle seat according to the invention which is present in a transition position for example from a sitting position to a space-saving position.

As compared with the positioning of the seat 1 as shown in FIG. 4, only the frame 3b of the seat part is now moved in the direction of the frame 2b of the backrest, as a result of which the second cam disc 7 performs a rotational movement in the clockwise direction A about the common axle 5 and thus forces the portion 41a of the second leaf spring 41 to move out of the first locking area 7a of the second cam disc 7. As a result, the leaf spring 41 is acted upon with a force or a compressive force which transfers the leaf spring 41 clamped in a fixed manner in the clamping apparatus 45 out of a first clamped position, in which the leaf spring 41 extends substantially in the vertical direction H of the seat, into a second likewise clamped position, as a result of which the leaf spring 41 or preferably the upper area of the leaf spring 41 in the vertical direction H of the seat is bent towards the rear in the longitudinal direction L of the seat, as a result of which the leaf spring 41 is consequently orientated at a fixed angle to the first position.

The frame 3b of the seat part and the support element 30 arranged on it are now situated in a transition position not capable of being locked, for example at an angle of between 0° and 90° with respect to the frame 2b of the backrest.

The position of the frame 2b of the backrest and of the first cam disc 6 has remained unchanged with respect to the position as shown in FIG. 4.

Figure 6:
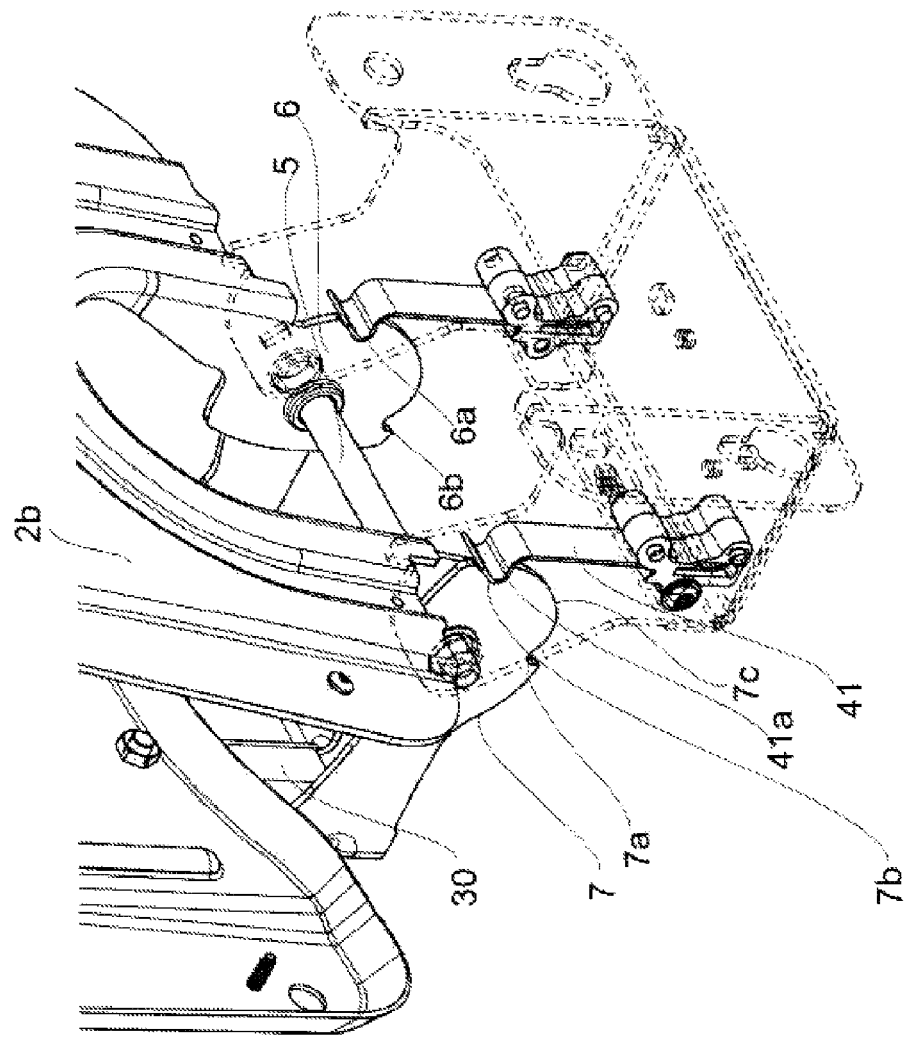
FIG. 6 is a partial view of the base frame of an embodiment of the vehicle seat according to the invention which is locked in a space-saving position.

FIG. 6 is a partial view of the base frame of an embodiment of the vehicle seat according to the invention which is locked in a space-saving position, the frame 2b of the backrest and the frame 3b of the seat part extending substantially at a right angle to the surface of the vehicle floor (not shown here) or in the vertical direction H of the seat in accordance with the positioning of the seat 1 as shown in FIG. 3.

The position of the frame 2b of the backrest and of the first cam disc 6 has remained unchanged with respect to the position as shown in FIG. 4 and FIG. 5 respectively.

Only the frame 3b of the seat part has moved or has been folded further in the direction of the frame 2b of the backrest into a second locking position with respect to the transition position shown in FIG. 5. As a result, the second cam disc 7 has also been rotated further about the common axle 5, as a result of which the portion 41a of the second leaf spring 41 has been moved further by way of the cam path 7c or the edge 7c of the second cam disc 7 or the edge 7c of the cam disc has been moved along the portion 41a. The cam disc 7 or the frame 3b of the seat part has consequently been rotated about the common axle 5 until the portion 41a was able to engage on the second locking area 7b of the second cam disc 7.

Consequently the leaf spring 41 has occupied its first clamped position again and accordingly it extends substantially in the vertical direction H of the seat again.

As a result, the second locking area 7b of the second cam disc 7 is situated opposite the first locking area 6a of the first cam disc 6 in the width-wise direction B of the seat, in which case the first locking area 7a of the second cam disc 7 and the second locking area 6b of the first cam disc 6 are situated in each case below the common axle 5 in the vertical direction H of the seat.

Figure 7:
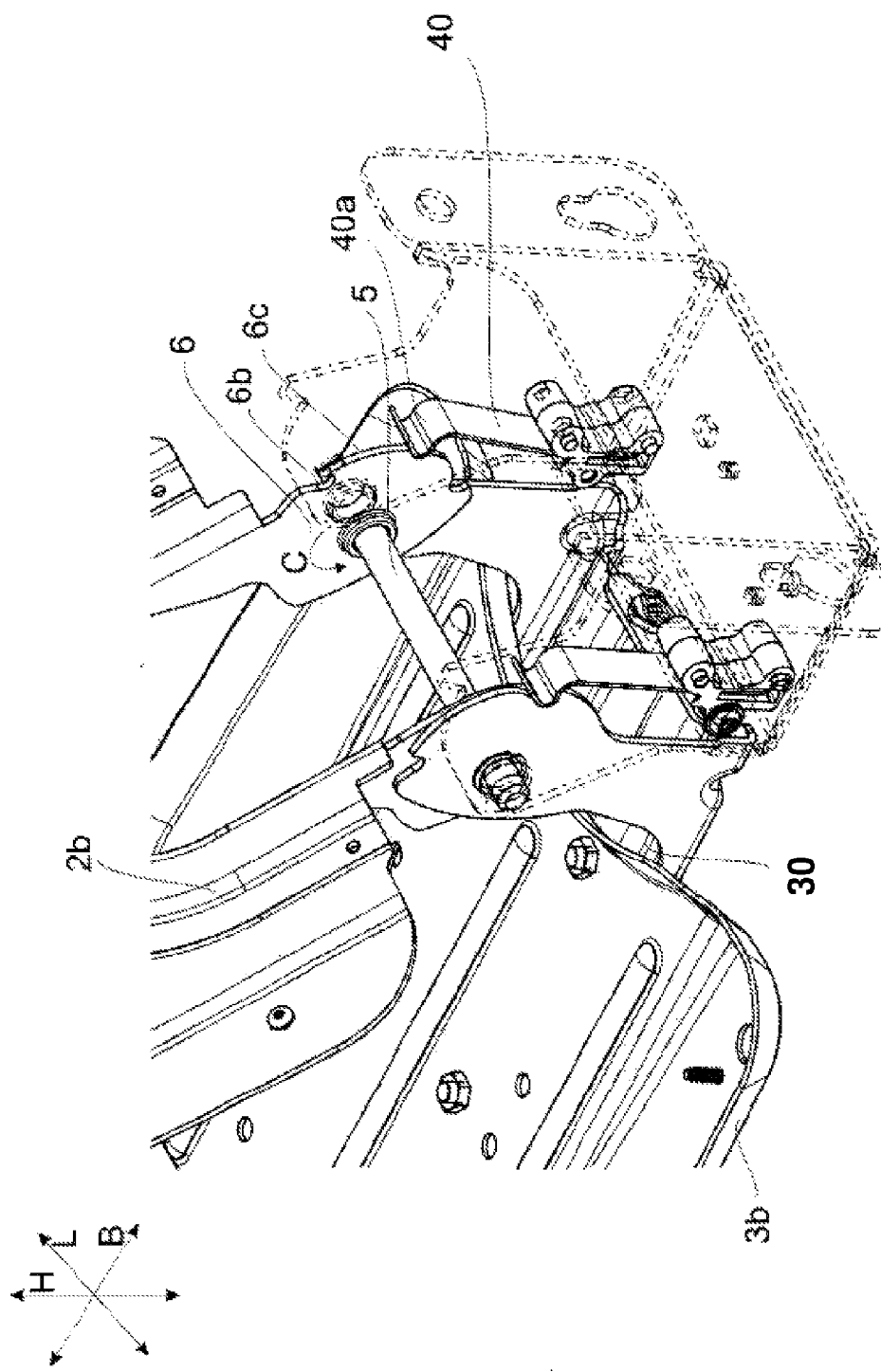
FIG. 7 is a partial view of the base frame of an embodiment of the vehicle seat according to the invention which is present in a transition position for example from a sitting position to a table position.

FIG. 7 is a partial view of the base frame of an embodiment of the vehicle seat according to the invention which is present in a transition position for example from a sitting position to a table position, the position of the frame 3b of the seat part as shown in FIG. 4 having remained unchanged and only the frame 2b of the backrest being moved or folded in the direction of the frame 3b of the seat part.

On account of the movement of the frame 2b of the backrest in the direction of the frame 3b of the seat part the first cam disc 6 is also rotated in the anti-clockwise direction C about the common axle 5.

As a result of this rotational movement of the first cam disc 6 the first leaf spring 40 or the portion 40a of the curved area of the leaf spring 40 is moved out of the first locking are 6a of the first cam disc 6, as a result of which the leaf spring 40 is acted upon with a compressive force and consequently is forced out of a first clamped position into a second clamped position.

This means that the leaf spring 40 is transferred from a position orientated substantially in the vertical direction H of the seat into a second position, likewise clamped, as a result of which the leaf spring 40 or preferably the upper area of the leaf spring 40 in the longitudinal direction L of the seat is curved towards the rear in the longitudinal direction L of the seat, as a result of which the leaf spring 40 is orientated at an acute angle to the first position.

On account of the rotational movement of the first cam disc 6 the cam path 6c or the edge 6c of the cam disc is moved past the portion 40a of the leaf spring 40, in which case, however, the portion 40a preferably always touches the first cam disc 6 or the edge 6c of the first cam disc 6.

The frame 2b of the backrest is now in a transition position—not capable of being locked—at an angle of between 0° and 90° with respect to the frame 3b of the seat part.

Figure 8:
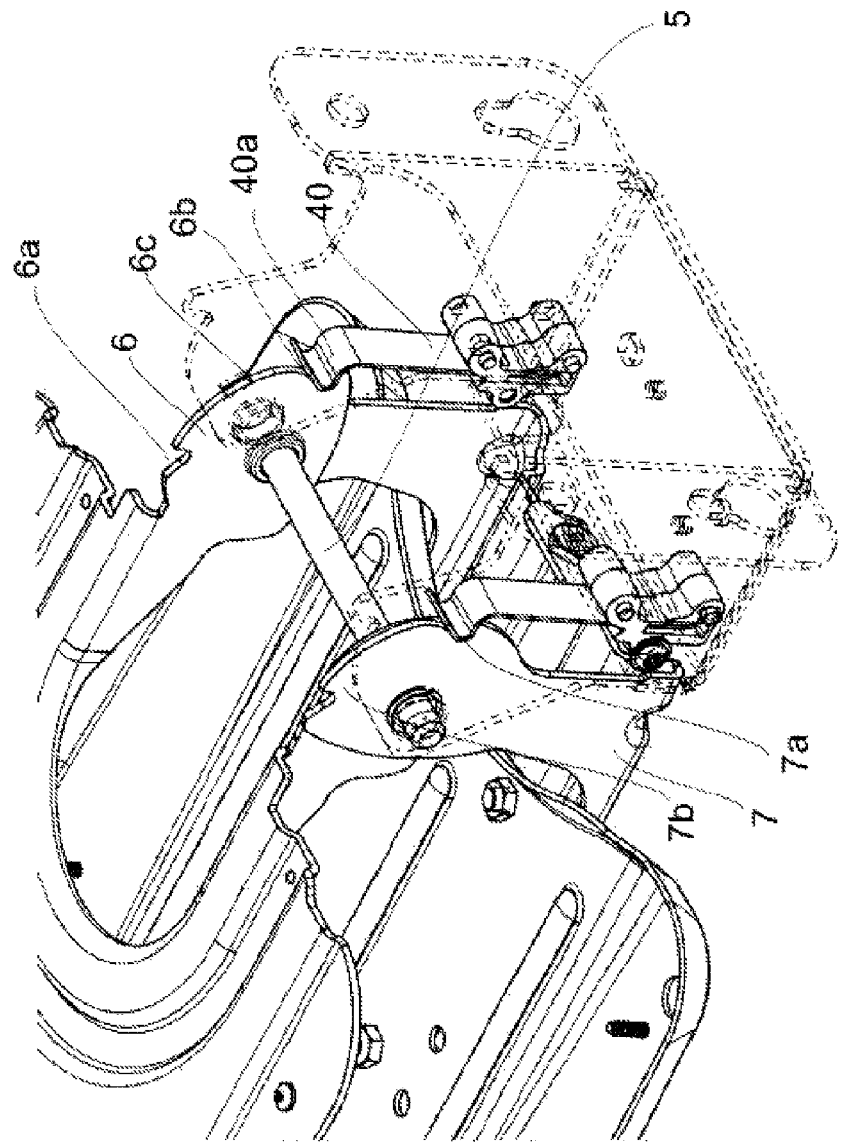
FIG. 8 is a partial view of the base frame of an embodiment of the vehicle seat according to the invention which is locked in a table position.

FIG. 8 is a partial view of the base frame of an embodiment of the vehicle seat according to the invention which is locked in a table position as shown in FIG. 2, only the frame 2b of the backrest being moved or folded further out of the transition position shown in FIG. 7 in the direction of the frame 3b of the seat part, as a result of which the frame 3b of the seat part and the frame 2b of the backrest now extend in each case substantially in the longitudinal direction L of the seat.

On account of the continued movement of the frame 2b of the backrest the first cam disc 6 was again rotated in the anti-clockwise direction C until the portion 40a of the first leaf spring 40 was able to engage in the second locking area 6b of the first cam disc 6.

It was thus possible for the leaf spring 40 to pass from its second clamped position into its first clamped position and consequently it locks the frame 2b of the backrest in a table position.

As a result, the second locking region 6b of the first cam disc 6 is situated opposite the first locking area 7a of the second cam disc 7 in the width-wise direction B of the seat, the first locking area 6a of the first cam disc 6 and the second locking area 7b of the second cam disc 7 being situated in each case above the common axle in the vertical direction H of the seat.

An adjustment of the seat part 3 and of the backrest 2 is possible for example by the use of human muscle power, i.e. manually, in which case, however, an electrically controlled system for setting the seat part 3 and the backrest 2 respectively can also be arranged on the seat 1.

The Applicants claim all the features disclosed in the application documents as being essential to the invention, insofar as they are novel either individually or in combination as compared with the prior art.

LIST OF REFERENCES 1 vehicle seat
2 backrest
2a resting face
2b frame of the backrest
3 seat part
3a seat face
3b frame of the seat part
4 belt system
4a belt tensioning means or belt retractor
4b insertion tongue
4c belt lock
4d belt strap
5 common axle
6 first cam disc
6a first locking area
6b second locking area
6c edge of the cam disc
7 second cam disc
7a first locking area
7b second locking area
7c edge of the cam disc
8 first support arm
9 second support arm
10 lateral fastening element
11 holding element
11a through opening/bore
11b bore
12 corrugations
13 table element
20 cup holder
30 support element
31 screws
40 first leaf spring
40a portion of the curved area
41 second leaf spring
41a portion of the curved area
42 spring
43 bores
44 nut
45 clamping apparatus
A clockwise direction
B width-wise direction of the seat
C anti-clockwise direction
H vertical direction of the seat
L longitudinal direction of the seat

The invention claimed is:

1. A foldable vehicle seat comprising a backrest and a seat part, wherein the backrest is made foldable and is connected at least to a first cam element and the seat part is made foldable and is connected at least to a second cam element, wherein the first and the second cam elements are arranged at a distance from each other in the width-wise direction of the seat and are arranged so as to be rotatable independently of each other about a common axle extending in the width-wise direction of the seat, so that the backrest and the seat part are rotatable by at least 90°, wherein the first and the second cam elements have in each case at least two locking areas, wherein the locking areas are designed in the form of recesses wherein a portion of an area of at least one leaf spring engages in each case, wherein the portion of the area of the at least one leaf spring is made curved at least in part, wherein the at least one leaf spring, which interacts with the cam element, rests in each case against each cam element on the outside, as at least the portion of the area of the at least one leaf spring engages in the locking areas.

2. The vehicle seat according to claim 1, wherein the cam elements are designed in the form of cam discs which in each case have one edge at least locally on which the recesses are arranged.

3. The vehicle seat according to claim 2, wherein the locking areas extend in the radial direction from the surface of the edge of the cam disc towards the inside and over the entire width of the edge of the cam disc and over a defined area along the edge of the cam disc.

4. The vehicle seat according to claim 1, wherein the first locking area of the first cam element is situated substantially opposite the first locking area of the second cam element in the width-wise direction of the seat when a seat face of the seat element extends substantially parallel and a resting face of the backrest extends substantially at a right angle to a surface of the vehicle floor.

5. The vehicle seat according to claim 1, wherein the second locking area of the second cam element is situated substantially opposite the first locking area of the first cam element in the width-wise direction of the seat when a seat face of the seat element and a resting face of the backrest extend substantially at a right angle to a surface of the vehicle floor in each case.

6. The vehicle seat according to claim 1, wherein the second locking area of the first cam element is substantially opposite the first locking area of the second cam element in the width-wise direction of the seat when a seat face of the seat element and a resting face of the backrest extend substantially parallel to a surface of the vehicle floor in each case.

7. The vehicle seat according to claim 1, wherein the backrest is arranged with a side opposite a side arranged on the first cam element with a first support arm rotatable about the common axle.

8. The vehicle seat according to claim 1, wherein the seat part is arranged with a side opposite a side arranged on the second cam element with a second support arm rotatable about the common axle.

9. The vehicle seat according to claim 1, wherein the leaf springs are arranged in each case with an end area rotationally rigid at least locally in one respective clamping apparatus which is releasable in order to replace the leaf springs.

\* \* \* \* \*